US012578572B2

(12) United States Patent
Gao et al.

(10) Patent No.: US 12,578,572 B2
(45) Date of Patent: Mar. 17, 2026

(54) METHOD FOR MEASURING DEFLECTION ANGLE OF GALVANOMETER SCANNER, AND LASER RADAR USING METHOD

(71) Applicant: HESAI TECHNOLOGY CO., LTD., Shanghai (CN)

(72) Inventors: Yongfeng Gao, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 1026 days.

(21) Appl. No.: 17/563,340

(22) Filed: Dec. 28, 2021

(65) Prior Publication Data

US 2022/0120864 A1 Apr. 21, 2022

Related U.S. Application Data

(63) Continuation of application No. PCT/CN2020/104776, filed on Jul. 27, 2020.

(30) Foreign Application Priority Data

Aug. 31, 2019 (CN) .......................... 201910819915.8

(51) Int. Cl.
| | |
|---|---|
| *G01S 7/481* | (2006.01) |
| *G01S 17/04* | (2020.01) |
| *G01S 17/06* | (2006.01) |
| *G01S 17/42* | (2006.01) |
| *G01S 17/88* | (2006.01) |
(Continued)

(52) U.S. Cl.
CPC .......... *G02B 26/105* (2013.01); *G01S 7/4813* (2013.01); *G01S 7/4817* (2013.01);
(Continued)

(58) Field of Classification Search
CPC ...... G01S 7/481; G01S 7/4811; G01S 7/4813; G01S 7/4817; G01S 17/02; G01S 17/04;
(Continued)

(56) References Cited

U.S. PATENT DOCUMENTS

| | | | | |
|---|---|---|---|---|
| 5,107,212 A | | 4/1992 | Dobler et al. | |
| 5,767,666 A | * | 6/1998 | Asada .................. | G02B 26/105 |
| | | | | 359/198.1 |

(Continued)

FOREIGN PATENT DOCUMENTS

| | | |
|---|---|---|
| CN | 102549386 A | 7/2012 |
| CN | 106787247 A | 5/2017 |

(Continued)

OTHER PUBLICATIONS

Raju et al., 2014, IEEE Transactions on Power Electronics, vol. 29, No. 1, pp. 481-490.*

(Continued)

*Primary Examiner* — Douglas X Rodriguez
*Assistant Examiner* — Kendrick X Liu
(74) *Attorney, Agent, or Firm* — Sheppard Mullin Richter & Hampton LLP

(57) ABSTRACT

A method for measuring a tilt angle of a vibrating mirror, and a lidar using the method are provided. The vibrating mirror a first surface, an excitation coil is disposed on the first surface, the vibrating mirror is disposed adjacent to a fixed second surface, and an induction coil is disposed on the second surface. The method for measuring a tilt angle of a vibrating mirror includes: inputting a current signal to the excitation coil to generate an excitation current on the excitation coil; in response to receiving the current signal, detecting an induction voltage signal generated on the induction coil; determining a variation of distance between the excitation coil and the induction coil according to the induction voltage signal and an initial distance between the excitation coil and the induction coil; and determining a tilt angle of the first surface according to the variation of distance.

8 Claims, 4 Drawing Sheets

(51) Int. Cl.
    *G02B 26/08*       (2006.01)
    *G02B 26/10*       (2006.01)
(52) U.S. Cl.
    CPC .............. *G01S 17/04* (2020.01); *G01S 17/06*
        (2013.01); *G01S 17/42* (2013.01); *G01S 17/88*
            (2013.01); *G02B 26/085* (2013.01)
(58) Field of Classification Search
    CPC ..... G01S 17/06; G01S 17/88; G02B 26/0833;
        G02B 26/085; G02B 26/10; G02B 26/105
    See application file for complete search history.

(56)            References Cited

U.S. PATENT DOCUMENTS

| | | |
|---|---|---|
| 9,080,896 B2 | 7/2015 | Wallrafen |
| 2020/0278427 A1* | 9/2020 | Chen ..................... G01S 7/4972 |

FOREIGN PATENT DOCUMENTS

| | | |
|---|---|---|
| CN | 106996738 A | 8/2017 |
| CN | 110568421 A | 12/2019 |
| JP | 2000039321 A * | 2/2000 |
| JP | 2015-010970 A | 1/2015 |

OTHER PUBLICATIONS

PCT International Search Report and the Written Opinion mailed Nov. 3, 2020, issued in related International Application No. PCT/CN2020/104776, with partial English translation (11 pages).

* cited by examiner

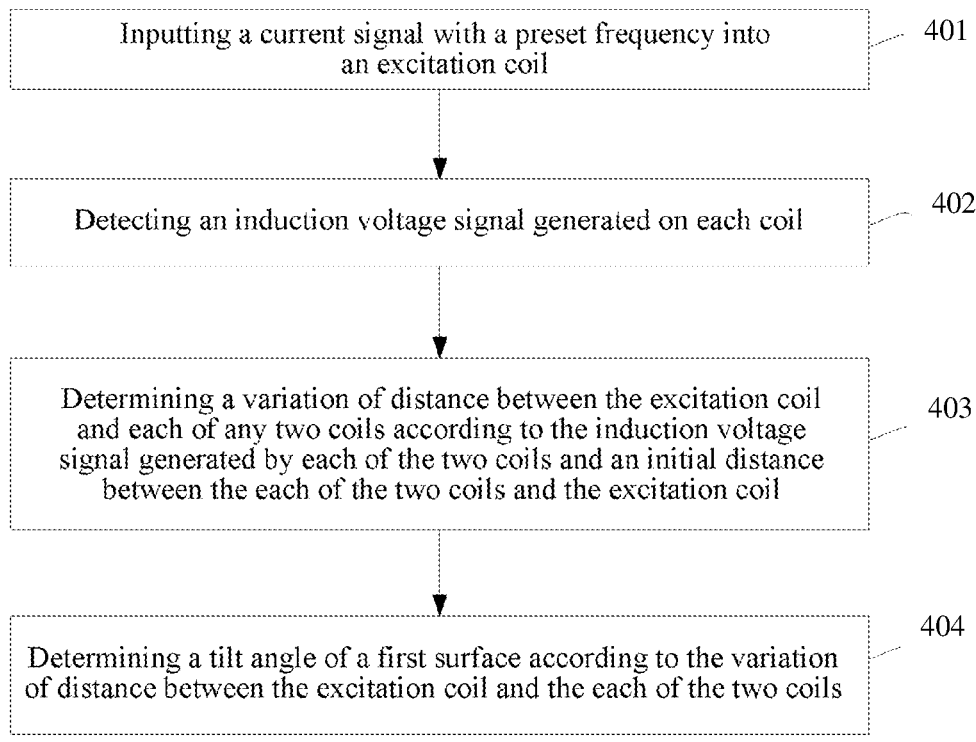

Inputting a current signal with a preset frequency into an excitation coil — 401

Detecting an induction voltage signal generated on each coil — 402

Determining a variation of distance between the excitation coil and each of any two coils according to the induction voltage signal generated by each of the two coils and an initial distance between the each of the two coils and the excitation coil — 403

Determining a tilt angle of a first surface according to the variation of distance between the excitation coil and the each of the two coils — 404

FIG. 4

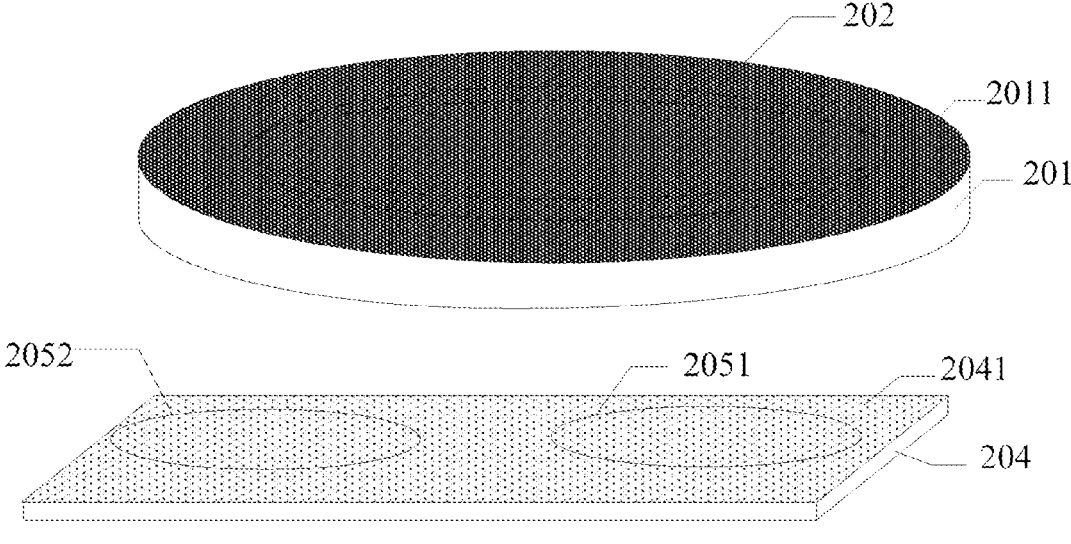

METHOD FOR MEASURING DEFLECTION ANGLE OF GALVANOMETER SCANNER, AND LASER RADAR USING METHOD

CROSS-REFERENCE TO RELATED APPLICATIONS

This application is a Continuation application of International Patent Application No. PCT/CN2020/104776, filed on Jul. 27, 2020, which is based on and claims priority to and benefits of Chinese Patent Application No. 201910819915.8, filed on Aug. 31, 2019. The entire content of all of the above identified applications is incorporated herein by reference.

TECHNICAL FIELD

This application relates to the field of laser detection, and in particular, to a method for measuring a tilt angle of a vibrating mirror for scanning and a lidar using the method.

BACKGROUND

A scanning mirror-based lidar is regarded as an important technical solution in a solid-state lidar architecture, wherein a ray of light from a laser is reflected by a rotatable vibrating mirror to achieve scanning. The scanning mirror-based lidar requires relatively fewer laser transmitters and receivers, and has a relatively simpler system structure. During operation, only the vibrating mirror oscillates within a certain range. In this way, the lidar itself does not need to rotate across a large degree, which increases the reliability of the system.

During the operation of the scanning mirror-based lidar, it is necessary to measure the rotation or swing angle of the vibrating mirror to determine the spatial angular position of each measuring laser when striking an obstacle. These spatial angular positions are combined with the distance from the obstacle calculated based on the time difference, to determine the position and the shape of the obstacle.

SUMMARY

This application provides a method for measuring a tilt angle of a vibrating mirror for scanning and a lidar using the method. An excitation coil is disposed on a first surface of the vibrating mirror for scanning, and an induction coil is disposed on a fixed second surface adjacent to the first surface. A tilt angle of the first surface is determined according to an induction voltage signal of the induction coil to a current in the excitation coil. In this way, the tilt angle of the vibrating mirror for scanning is measured.

In a first aspect, this application provides a method for measuring a tilt angle of a vibrating mirror. The vibrating mirror comprises a first surface, an excitation coil is disposed on the first surface, the vibrating mirror is disposed adjacent to a fixed second surface, and an induction coil is disposed on the second surface. The method includes: providing a current signal to the excitation coil to generate an excitation current on the excitation coil; detecting an induction voltage signal generated on the induction coil; determining a variation of a distance between the excitation coil and the induction coil according to the induction voltage signal and an initial distance between the excitation coil and the induction coil; and determining a tilt angle of the first surface according to the variation of distance.

In some embodiments, the induction coil includes a first coil. Detecting the induction voltage signal generated on the induction coil includes: detecting the induction voltage signal generated on the first coil; and determining the variation of the distance between the excitation coil and the induction coil according to the induction voltage signal and the initial distance between the excitation coil and the induction coil includes: determining a variation of the distance between the excitation coil and the first coil according to the detected induction signal on the first coil and the initial distance.

In some embodiments, the induction coil includes two or more coils, and each of the two or more coils is located at a different position on the second surface. Detecting the induction voltage signal generated on the induction coil includes: detecting the induction voltage signal generated on the each of the two or more coils; and determining the variation of the distance between the excitation coil and the induction coil according to the induction voltage signal and the initial distance between the excitation coil and the induction coil includes: determining a variation of a distance between the excitation coil and each of the two or more coils according to the induction voltage signal generated by each of the two or more coils and an initial distance between each of the two or more coils and the excitation coil.

In some embodiments, determining the variation of distance between the excitation coil and each of the two or more coils according to the induction voltage signal generated on each of the two or more coils and the initial distance between each of the two or more coils and the excitation coil includes: determining the variation of the distance between the excitation coil and each of the two or more coils according to differences between the induction voltage signals generated by the two or more coils, and the initial distance between the excitation coil and each of the two or more coil. s In some embodiments, a sensitivity for measuring a tilt angle of the vibrating mirror is determined according to the current signal and the initial distance.

In some embodiments, determining the variation of the distance between the excitation coil and each of the two or more coils according to the induction voltage signal generated by each of the two or more coils and the initial distance between each of the two or more coils and the excitation coil includes: the distance between the excitation coil and each of the two or more coils according to differences between the induction voltage signals generated by the two or more coils, a sum of the induction voltage signals generated by the two or more coils, and the initial distance between the excitation coil and each of the two or more coils.

In some embodiments, the method further includes: reducing the initial distance and/or increasing the excitation current to reduce noise for measuring the tilt angle.

In a second aspect, an embodiment of this application provides a lidar, including a vibrating mirror, a stationary member adjacent to the vibrating mirror, and a signal processor, The vibrating mirror has a first surface, and the stationary member has a second surface; an excitation coil is disposed on the first surface, and at least one coil is disposed on the second surface. The vibrating mirror is rotatable with respect to a rotation axis of the vibrating mirror. The signal processor is configured to measure a tilt angle of the first surface by using any method of the first aspect.

In some embodiments, the second surface is located above or below the first surface.

In some embodiments, a size of the at least one coil is less than a size of the excitation coil.

In some embodiments, the at least one coil includes two coils, and the two coils are disposed on two sides of the rotation axis and are symmetrical with respect to the rotation axis.

According to the method for measuring a tilt angle of a vibrating mirror for scanning and the lidar using the method provided in the embodiments of this application, the vibrating mirror for scanning is adjacent to the fixed second surface, the excitation coil is disposed on the first surface, and the induction coil is disposed on the second surface. The first surface and the second surface are both planes. The method includes: inputting a current signal with a preset frequency into the excitation coil; detecting an induction voltage signal generated on the induction coil; determining a variation of distance between the excitation coil and the induction coil according to the induction voltage signal; and determining a tilt angle of the first surface according to the variation of distance. In this way, the tilt angle of the vibrating mirror for scanning is measured.

BRIEF DESCRIPTION OF THE DRAWINGS

Other features, objectives, and advantages of this application become more apparent by reading the detailed description of non-limiting embodiments that is provided with reference to the following accompanying drawings.

FIG. 4 shows another schematic flowchart of a method for measuring a tilt angle of a vibrating mirror for scanning according to an embodiment of this application.

FIG. 5 shows a schematic perspective view illustrating another mutual positional relationship between an excitation coil and an induction coil in a method for measuring a tilt angle of a vibrating mirror for scanning according to an embodiment of this application.

DETAILED DESCRIPTION

This application is further described in detail below with reference to the accompanying drawings and embodiments. It is to be understood that specific embodiments described herein are merely used for the explanation of the relevant invention, but do not limit the invention. It is to be further noted that, for ease of description, only parts related to the relevant invention are shown in the accompanying drawings.

It is to be noted that the embodiments in this application and features in the embodiments may be combined with each other in the case of no conflict. The following describes this application in detail with reference to the accompanying drawings and the embodiments.

Figure 1:
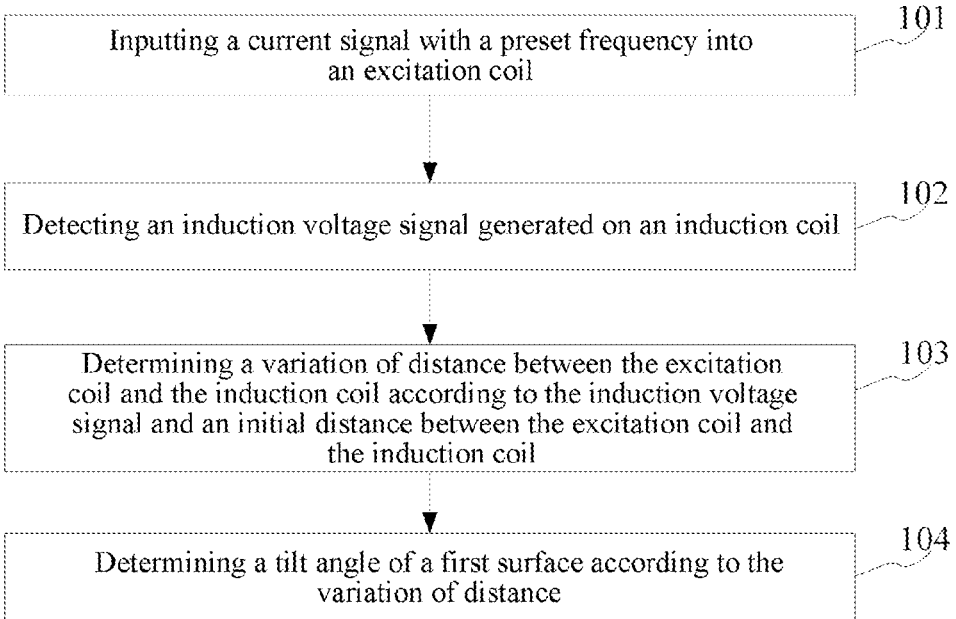
FIG. 1 shows a schematic flowchart of a method for measuring a tilt angle of a vibrating mirror for scanning according to an embodiment of this application.
Figure 2:
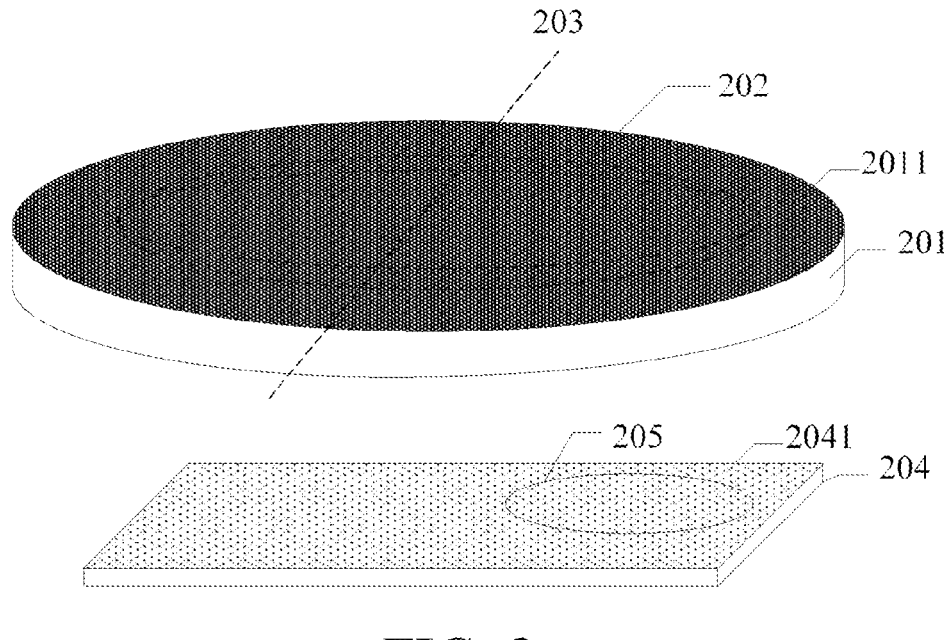
FIG. 2 shows a schematic perspective view illustrating a mutual positional relationship between an excitation coil and an induction coil in a method for measuring a tilt angle of a vibrating mirror for scanning according to an embodiment of this application.
Figure 3:
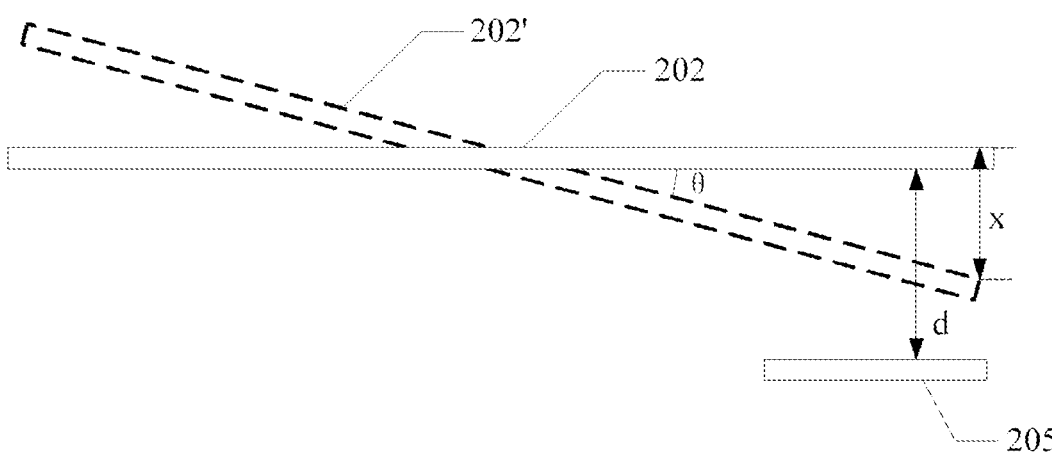
FIG. 3 shows a schematic diagram illustrating mechanisms for determining a tilt angle of a vibrating mirror for scanning according to the mutual positional relationship between the excitation coil and the induction coil shown in FIG. 2.

Refer to FIG. 1, FIG. 2, and FIG. 3. FIG. 1 shows a schematic flowchart of a method for measuring a tilt angle of a vibrating mirror for scanning according to an embodiment of this application. FIG. 2 shows a schematic perspective view illustrating a mutual positional relationship between an excitation coil and an induction coil in a method for measuring a tilt angle of a vibrating mirror for scanning according to an embodiment of this application. FIG. 3 shows a schematic principle diagram of determining a tilt angle of a vibrating mirror for scanning according to the mutual positional relationship between the excitation coil and the induction coil shown in FIG. 2.

Generally, the vibrating mirror for scanning includes a scanning substrate, and the scanning substrate includes a movable portion 201. The movable portion has a first surface 2011. The first surface 2011 here may be a surface used to reflect a scanning beam, and may further be a surface of the vibrating mirror for scanning parallel to the surface reflecting the scanning beam.

An excitation coil 202 may be disposed on the first surface 2011. In some application scenarios, the excitation coil may further be integrated in the movable portion 201 of the vibrating mirror for scanning, or may be made transparent and placed on a reflective surface (that is, the vibrating mirror for scanning), and the like, which is not limited herein.

The movable portion is rotatable with respect to a rotation axis 203 of the movable portion. It may be understood that the rotation axis 203 here is indicative. The rotation axis may further include other rotation axes at a preset angle to the rotation axis 203. The selection of the rotation axis can be set according to specific application scenarios, which is not limited herein.

A non-moving/stationary member 204 adjacent to the vibrating mirror for scanning has a second surface 2041. An induction coil 205 may be disposed on the second surface 2041. The induction coil 205 may be located below the excitation coil 202. In addition, the induction coil 205 may further be disposed on a same horizontal plane as the excitation coil 202.

In this embodiment, the first surface 2011 and the second surface 2041 may be planes or may be curved surfaces.

As shown in FIG. 1, the method for measuring a tilt angle of a vibrating mirror for scanning includes the following steps.

Step 101: Inputting/providing a current signal with a preset frequency to an excitation coil.

The preset frequency herein may be, for example, 100 HZ, 200 HZ, and the like, which can be set according to specific application scenarios and are not limited herein. The current signal herein may be a pulse current signal or a sinusoidal AC signal. According to the phenomenon of induction, when a current signal with a preset frequency is applied to the excitation coil 202, the excitation coil 202 generates an alternating magnetic field. Under the action of the alternating magnetic field, an induction voltage is generated in the induction coil 205. Generally, a coefficient M of induction between two adjacent coils is $$M = \frac{1}{d^n},$$

where d is a distance between the excitation coil 202 and the induction coil 205, and n>1. The distance between the excitation coil 202 and the induction coil 205 may be a vertical distance between one end point of a long axis of the excitation coil 202 and a plane where the induction coil 205 is located.

Step 102: Detecting an induction voltage signal generated on the induction coil.

A current with a preset frequency may be inputted into the excitation coil 202 before the first surface 2011 is rotated. The induction voltage in the induction coil 205 is $$A = \frac{C \times i}{d^n}. \tag{1}$$

Where i represents an excitation current, d is the initial distance between the excitation coil and the induction coil, and A is a measurement value. Different current amplitudes and different distances may be set. The values of C and n may be determined according to the plurality of A values obtained according to the set different current amplitudes and different distances.

When the first surface 2011 rotates, the induction voltage signal generated on the induction coil 205 may be detected to obtain the induction voltage value generated by the induction coil 205 under the current applied to the excitation coil 202.

Step 103: Determining a variation of a distance between the excitation coil and the induction coil according to the induction voltage signal and an initial distance between the excitation coil and the induction coil.

In some application scenarios, before the vibrating mirror for scanning rotates, the excitation coil 202 and the induction coil 205 may be disposed in parallel. The initial distance may be a vertical distance between the excitation coil 202 and the induction coil 205 when the vibrating mirror for scanning does not rotate. The initial distance herein may be represented as d.

When the vibrating mirror for scanning rotates, the distance (may be a shortest distance) between the excitation coil 202 and the induction coil 205 may change.

Referring to FIG. 3, if the first surface 2011 rotates from the initial position to a new position (as shown in 202') by an angle, the distance between the excitation coil 202 and the induction coil 205 changes with respect to the distance at the initial time. For example, the distance between the excitation coil 202 and the induction coil 205 is reduced by x. At this point, a relationship between the excitation current i flowing through the excitation coil 202 and the induction voltage A1 on the induction coil 205 is shown in the following formula 2:

$$A1 = \frac{C \times i}{(d-x)^n}. \tag{2}$$

A1 is the measurement value, C and n are both constants, and d is the initial distance between the excitation coil and the induction coil.

The value of x may be obtained according to formula (2).

Step 104: Determining a tilt angle of a first surface according to the variation of the distance.

After the variation of the distance between the excitation coil 202 and the induction coil 205 is obtained in the above step 103, the tilt angle of the excitation coil 202, that is, the tilt angle of the first surface 2011, can be calculated according to a trigonometric function.

Specifically, if an angle at which the first surface rotates counterclockwise about the rotation axis 203 is positive, an angle at which the first surface rotates clockwise is negative. If a distance between two endpoints of the excitation coil 202 is 2R (if an outline of the excitation coil is a circle, the distance between the two endpoints is a diameter of the circle), as shown in FIG. 3, a rotation angle θ at which the first surface 202 rotates to 202' may be represented as:

$$\theta = -\arctan\frac{x}{R}. \tag{3}$$

According to the method for measuring a tilt angle of a vibrating mirror for scanning provided in this embodiment, the excitation current is provided in the excitation coil 202 disposed on the first surface of the vibrating mirror for scanning, and the induction voltage in the induction coil disposed on the second surface adjacent to the first surface is detected to determine the variation of distance between the excitation coil 202 and the induction coil 205. The tilt angle of the first surface is determined according to the variation of the distance, so as to obtain the tilt angle of the vibrating mirror for scanning.

Figure 6:
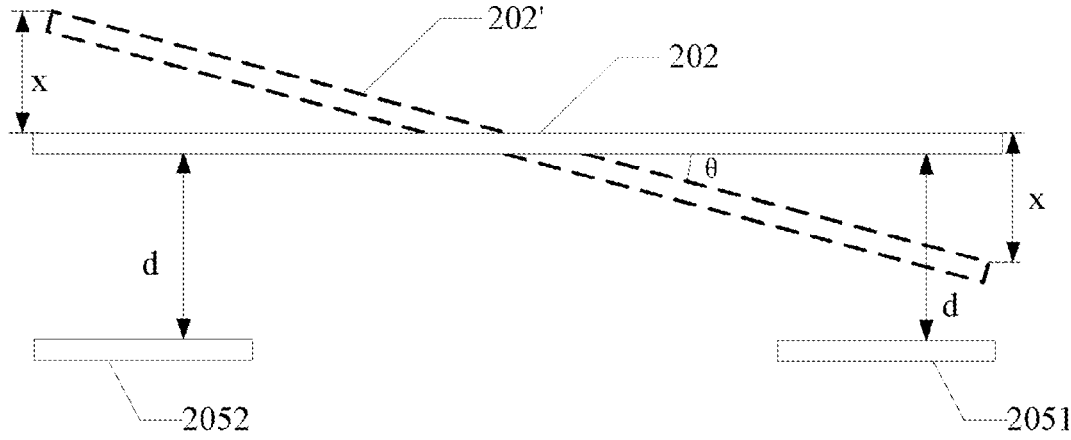
FIG. 6 shows a schematic principle diagram of determining a tilt angle of a vibrating mirror for scanning according to the mutual positional relationship between the excitation coil and the induction coil shown in FIG. 5.

Still refer to FIG. 4, FIG. 5, and FIG. 6. FIG. 4 shows another schematic flowchart of a method for measuring a tilt angle of a vibrating mirror for scanning according to an embodiment of this application. FIG. 5 shows a schematic perspective view illustrating another mutual positional relationship between an excitation coil and an induction coil in a method for measuring a tilt angle of a vibrating mirror for scanning according to an embodiment of this application. FIG. 6 shows a schematic principle diagram of determining a tilt angle of a vibrating mirror for scanning according to the mutual positional relationship between the excitation coil and the induction coil shown in FIG. 5.

Same as the embodiments shown in FIG. 1, FIG. 2, and FIG. 3, the vibrating mirror for scanning involved in this embodiment includes a scanning substrate, and the scanning substrate includes a movable portion 201. The movable portion has a first surface 2011. An excitation coil 202 may be disposed on the first surface 2011. In addition, the excitation coil may further be disposed in the movable portion. The movable portion is rotatable about a rotation axis 203 of the movable portion. It may be understood that the rotation axis 203 here is schematic. The rotation axis may further include other rotation axes at a preset angle to the rotation axis 203. The arrangement of the rotation axis can be set according to specific application scenarios, which is not limited herein.

A stationary member 204 adjacent to the vibrating mirror for scanning has a second surface 2041. The induction coil may be disposed on the second surface. The induction coil may include two or more coils. Different coils are at different positions on the second surface. The two or more coils may be located below and above the excitation coil. In addition, the two or more coils may further be disposed on a same horizontal plane as the excitation coil 202.

In this embodiment, the first surface 2011 and the second surface 2041 may be both planes.

As shown in FIG. 4, the method for measuring a tilt angle of a vibrating mirror for scanning includes the following steps.

Step 401: Inputting/providing a current signal with a preset frequency into an excitation coil.

In this embodiment, step 401 may be the same as or similar to step 101 in the embodiment shown in FIG. 1, and details will not be described herein.

Step 402: Detecting an induction voltage signal generated on each coil.

In some application scenarios, a plurality of voltage signal detection units may be used to detect induction voltages generated on the plurality of coils. That is to say, each voltage signal detection unit corresponds to one coil, and the voltage signal detection units simultaneously detect the induction voltage signals on the coils. In some other application scenarios, a single voltage signal detection unit may further be used to successively detect the induction voltage signal generated on each of two or more coils.

For the relevant description of measuring the induction voltage signal on the each coil, reference may be made to the description of the example shown in FIG. 1, and details will not be described herein.

It should be noted that if the induction coil is located directly above or below the excitation coil 202, when the movable portion does not rotate, a current signal with a preset frequency is applied to the excitation coil 202, and the induction voltage signal generated on each coil may be equal.

Step 403: Determining a variation of a distance between the excitation coil and each of any two coils according to the induction voltage signal generated by each of the any two coils and an initial distance between the each of the two coils and the excitation coil.

If the first surface undergoes an angular tilt, the distance between each coil and the excitation coil will change. According to formula (1), if i does not change, the generated induction voltage may change compared with the induction voltage generated on each coil with no angular tilt relative to the first surface.

Any two coils disposed on the second surface 2041 may be selected, and the variation of distance between each of the two coils and the excitation coil is determined.

In some embodiments, two coils 2051 and 2052 that are disposed on two sides of the rotation axis of the vibrating mirror for scanning and symmetrical with respect to the rotation axis may be selected to determine the variation of distance between each of the two coils 2051 and 2052 and the excitation coil.

Referring to FIG. 6, it is assumed that the initial distance between the excitation coil 202 and the two coils 2051 and 2052 is d. If the excitation coil 202 rotates to a certain position clockwise along the rotation axis, the distance between the coil 2051 and the excitation coil 202 may be d-x, and the distance between the coil 2052 and the excitation coil 202 may be d+x.

The induction voltage generated by the coil 2051 being A1 and the induction voltage generated by the coil 2052 being A2 are used for description in the following:

$$A1 = \frac{C \times i}{(d - x)^n}; \tag{2}$$

$$A2 = \frac{C \times i}{(d + x)^n}. \tag{3}$$

i is the current on the excitation coil and is a known quantity, A1 and A2 are the measured induction voltage values and are known quantities, d is the initial distance between the excitation coil and each coil and is a known quantity, and n is an empirical value and is a known quantity. x may be determined according to formula (2) or (3), that is, an absolute value of the variation of distance between the coils 2051 and 2052 and the excitation coil.

During the rotation of the vibrating mirror for scanning, translational motion occurs due to being affected by the outside, that is, the vibrating mirror for scanning moves up or down under the impact of the outside. At this point, an error may occur in the value of x obtained by the formula (2) or (3). That is to say, the calculated value of x will be affected by the translational motion of the vibrating mirror for scanning. The value of x includes a component of the variation of distance between the excitation coil and the coil caused by the translational motion of the vibrating mirror for scanning.

An error occurs in the result of scanning an object by the vibrating mirror for scanning.

In this embodiment, it is assumed that the vibrating mirror for scanning moves down by x2. A1 and A2 may be expressed as formulas (4) and (5) as follows:

$$A1 = \frac{C \times i}{(d - x - x2)^n}; \tag{4}$$

$$A2 = \frac{C \times i}{(d + x - x2)^n}. \tag{5}$$

In order to eliminate the error of measuring x caused by the up or down movement of the vibrating mirror for scanning, step 403 may include: determining the variation of distance between the excitation coil and the induction coil according to a difference between the induction voltage signals generated by the any two coils, and the initial distance between the excitation coil and each of the any two coils. Specifically, refer to the formula 6:

$$A_{dif} = \tag{6}$$

$$A1 - A2 = \frac{C \times i}{(d - x - x2)^n} - \frac{C \times i}{(d + x - x2)^n} \approx \frac{2 \times n \times C \times i \times d^{n-1} \times x}{d^{2n}}.$$

$A_{dif}$ is the difference between the induction voltages A1 and A2 generated by the two coils 2051 and 2052, respectively. Since A1 and A2 are measurement values, $A_{dif}$ is also a known quantity. i is the current on the excitation coil and is a known quantity, A1 and A2 are the measured induction voltage values and are known quantities, d is the initial distance between the excitation coil and each coil and is a known quantity, and n is an empirical value and is a known quantity. It can be seen from formula (6) that the variation of distance between the excitation coil and the induction coil is calculated by using the difference between the induction voltages A1 and A2 generated by the two coils 2051 and 2052, so as to eliminate the impact brought by the translational motion of the vibrating mirror for scanning. In this way, the accuracy of the calculated value of x is higher.

The variation of distance between the induction coil and the excitation coil is determined by using the difference between the induction voltage signals generated by the two coils and the initial distance between the excitation coil and the induction coil. In this way, the component of the variation of distance between the induction coil and the excitation coil caused by the rotation of the first surface as a result of the translational motion of the vibrating mirror for scanning can be eliminated.

In some implementations, a sensitivity of measuring a tilt angle of the first surface may further be determined according to the current signal on the excitation coil and the initial distance between the excitation coil and the induction coil. Specifically, the sensitivity S of measuring the tilt angle of the first surface is expressed by the following formula:

$$S = \frac{A_{dif}}{x} = \frac{2 \times n \times C \times i}{d^{n+1}}. \tag{7}$$

Step 404: Determining a tilt angle of the first surface according to the variation of distance between the excitation coil and each of the any two coils.

Reference may be made to the detailed description of step 104 according to the embodiment shown in FIG. 1, and details are not described herein.

In some implementations, a plurality of sets of the coils may be determined from the plurality of coils, and each set includes two coils. For each set of the coils, the tilt angle of the first surface corresponding to the set of the coils may be determined by using the above method. Then, the tilt angle of the vibrating mirror for scanning is determined according to the tilt angle corresponding to each set of the coils. For example, a mean value of the tilt angles respectively corresponding to the sets of the coils is used as the tilt angle of the vibrating mirror for scanning.

According to the method for measuring a tilt angle of a vibrating mirror for scanning provided in this embodiment, compared with the embodiment shown in FIG. 1, the difference between the induction voltage signals of the two coils is used to determine the variation of distance between the induction coil and the excitation coil during the tilt of the vibrating mirror, to measure the tilt angle of the vibrating mirror. In this way, the deviation of the variation of distance between the excitation coil and the induction coil caused by the vibrating mirror tilt caused by the translational motion of the vibrating mirror due to the impact of the outside can be eliminated, thereby improving the accuracy of calculating the tilt angle of the vibrating mirror for scanning.

In some implementations, step 403 of determining the variation of distance between the excitation coil and each of any two coils according to the induction voltage signal generated by each of the any two coils and an initial distance between the each of the two coils and the excitation coil may further include:

determining the variation of distance between the excitation coil and the coil according to a difference between the induction voltage signals generated by any two coils, a sum of the induction voltage signals generated by the two coils, and the initial distance between the excitation coil and the each coil.

In these implementations, two coils are selected from the plurality of coils. For example, two coils 2051 and 2052 that are disposed on two sides of the rotation axis of the vibrating mirror for scanning and symmetrical with respect to the rotation axis may be selected. In step 402, it is detected that the induction voltages generated by the two coils 2051 and 2052 are A1 and A2 respectively. A difference between the two induction voltages A1 and A2 is calculated, to obtain Adif, and a sum Acm of the two induction voltages A1 and A2 is calculated. Then, a quotient of Adif and Acm is calculated. The details are as follows:

$$A_{cm} = \frac{A_1 + A_2}{2} = \frac{\frac{C \times i}{(d-x)^n} + \frac{C \times i}{(d+x)^n}}{2} \approx \frac{C \times i}{d^n}; \tag{8}$$

$$\frac{A_{dif}}{A_{cm}} \approx \frac{2 \times n \times x}{d}. \tag{9}$$

When the absolute value x of the variation of distance between the excitation coil and the induction coil is calculated by formula (9), x is only related to the first power of d and n. Compared with the value of x calculated by using formulas (2), (6), and the like, the absolute value x of the variation of distance between the excitation coil and the induction coil obtained according to formula (9) can greatly suppress the effect of the drift of d on the accuracy of the value of x.

In addition, in practical application, there will be environmental noise. The induction voltages A1 and A2 generated on the coils 2051 and 2052 are as follows:

$$A1 = \frac{C \times i}{(d-x)^n} + N1; \tag{10}$$

$$A2 = \frac{C \times i}{(d+x)^n} + N2. \tag{11}$$

N1 and N2 are the environmental noise respectively.

$$\frac{A_{dif}}{A_{cm}}$$

is expressed by the following formula (12):

$$\frac{A_{dif}}{A_{cm}} \approx \frac{2 \times n \times x}{d} + \frac{d^n}{C \times i}(N1 - N2) - \frac{2 \times x \times d^{n-1}}{C \times i}(N1 + N2). \tag{12}$$

It can be seen from formula (12) that either reducing the initial distance between the excitation coil and the coil or increasing the excitation current can improve the signal-to-noise ratio. There is no need to increase the size of the structure, and high-precision angle measurement can be achieved in a compact space.

Figure 7:
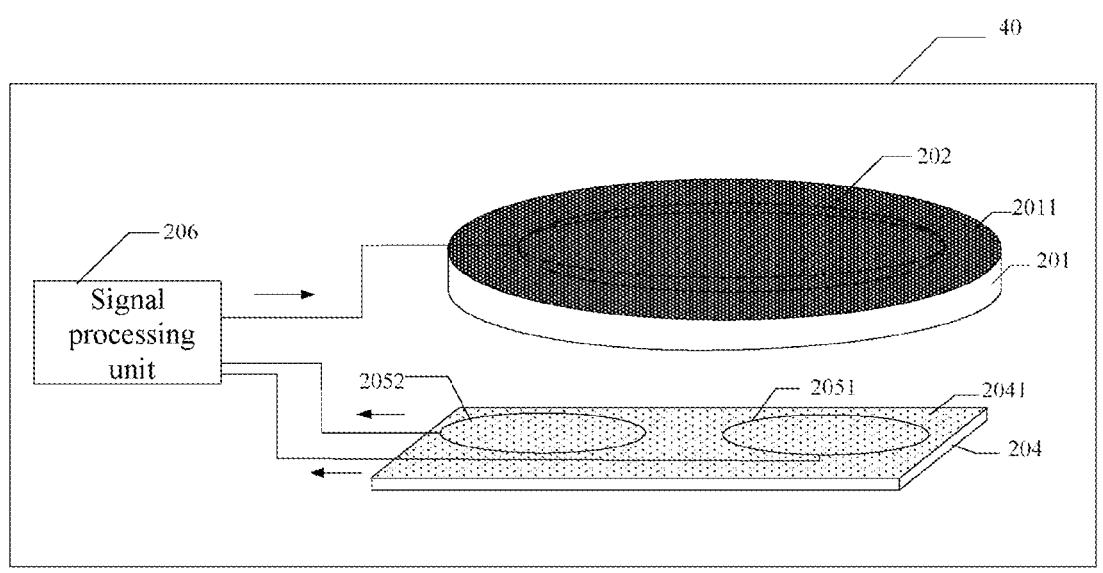
FIG. 7 shows a schematic structural diagram of a lidar according to an embodiment of this application.

Referring to FIG. 7, FIG. 7 shows a schematic structural diagram of a lidar according to an embodiment of this application.

As shown in FIG. 7, the lidar 40 includes a vibrating mirror for scanning 201, a stationary member 204 adjacent to the vibrating mirror for scanning, and a signal processing unit 206. The vibrating mirror for scanning 201 has a first surface 2011. The stationary member 204 has a second surface 2041. The first surface 2011 and the second surface 2041 may be both planes. An excitation coil 202 is disposed on the first surface 2011, and at least one induction coil 205 is disposed on the second surface 2041. The vibrating mirror for scanning 201 is rotatable about a rotation axis of the vibrating mirror for scanning.

The signal processing unit 206 is configured to measure a tilt angle of the first surface 2011 (that is, the vibrating mirror for scanning) by using the method shown in FIG. 1 or FIG. 4.

In some application scenarios, the second surface 2041 may be located on the first surface 2011, or may be located below the first surface 2011.

In this embodiment, a size of the induction coil 205 is less than a size of the excitation coil 202. The induction coil 205 may include one, two, or more coils.

In some embodiments, the induction coil 205 may include two coils. Further in some embodiments, the second surface may be located directly below the first surface.

The foregoing descriptions are merely some embodiments of this application and descriptions of technical principles used. A person of ordinary skill in the art should understand that, the invention scope related to this application is not limited to the technical solutions formed by specific combinations of the foregoing technical features, and further includes other technical solutions formed by any combination of the foregoing technical solution or equivalent features without departing from the inventive concept. For example, technical solutions formed by replacing the foregoing features with technical features and having similar functions disclosed in this application (but not limited to) are also included.

What is claimed is:

1. A method for measuring a tilt angle of a vibrating mirror, wherein the vibrating mirror comprises a first surface, an excitation coil is disposed on the first surface, the vibrating mirror is disposed adjacent to a fixed second surface, and an induction coil is disposed on the second surface, and wherein the method comprises:

providing a current signal to the excitation coil to generate an excitation current on the excitation coil;

detecting an induction voltage signal generated on the induction coil, wherein the induction coil comprises two or more coils, and each of the two or more coils is located at a different position on the second surface, and detecting the induction voltage signal generated on the induction coil comprises detecting two or more induction voltage signals generated on the two or more coils;

determining an initial distance between the excitation coil and the induction coil, wherein the initial distance is a vertical distance between the excitation coil and the induction coil when the vibrating mirror does not rotate;

determining a variation of a distance between the excitation coil and the induction coil according to the induction voltage signal and the initial distance between the excitation coil and the induction coil; and determining a tilt angle of the first surface according to the variation of the distance, wherein determining the variation of the distance between the excitation coil and the induction coil comprises:

determining the variation of the distance between the excitation coil and any one of the two or more coils according to (1) a difference between the two or more induction voltage signals generated on the two or more coils, (2) a sum of the two or more induction voltage signals generated on the two or more coils, and (3) the initial distance between the excitation coil and any one of the two or more coils, wherein:

when the vibrating mirror rotates, the variation of the distance between the excitation coil and a first coil in the two or more coils is equal in magnitude to the variation of the distance between the excitation coil and a second coil in the two or more coils; and the initial distance between the excitation coil and the first coil in the two or more coils is the same as the initial distance between the excitation coil and the second coil in the two or more coils.

2. The method according to claim 1, further comprising: determining, according to the current signal and the initial distance, a sensitivity for measuring the tilt angle of the vibrating mirror.

3. The method according to claim 1, wherein reducing the initial distance or increasing the excitation current improves a signal-to-noise ratio for measuring the tilt angle.

4. The method of claim 1, wherein the induction voltage signal on the induction coil is a function of a ratio between (1) the current signal to the excitation coil and (2) a difference between the initial distance and the variation of the distance.

5. A lidar, comprising: a vibrating mirror, a stationary member adjacent to the vibrating mirror, and a signal processor, wherein the vibrating mirror has a first surface, and the stationary member has a second surface; an excitation coil is disposed on the first surface, and at least one coil is disposed on the second surface; and wherein the vibrating mirror is rotatable with respect to a rotation axis of the vibrating mirror; and the signal processor is configured to measure a tilt angle of the first surface by:

providing a current signal to the excitation coil to generate an excitation current on the excitation coil;

detecting an induction voltage signal generated on the at least one coil, wherein the at least one coil comprises two or more coils, and each of the two or more coils is located at a different position on the second surface, and detecting the induction voltage signal generated on the at least one coil comprises detecting two or more induction voltage signals generated on the two or more coils;

determining a variation of a distance between the excitation coil and the at least one coil according to the induction voltage signal and an initial distance between the excitation coil and the at least one coil; and determining the tilt angle of the first surface according to the variation of distance, wherein determining the variation of the distance between the excitation coil and the at least one coil comprises:

determining the variation of the distance between the excitation coil and any one of the two or more coils according to (1) a difference between the two or more induction voltage signals generated on the two or more coils, (2) a sum of the two or more induction voltage signals generated on the two or more coils, and (3) the initial distance between the excitation coil and any one of the two or more coils, wherein:

when the vibrating mirror rotates, the variation of the distance between the excitation coil and a first coil in the two or more coils is equal in magnitude to the variation of the distance between the excitation coil and a second coil in the two or more coils; and the initial distance between the excitation coil and the first coil in the two or more coils is the same as the initial distance between the excitation coil and the second coil in the two or more coils.

6. The lidar according to claim 5, wherein the second surface is located above or below the first surface.

7. The lidar according to claim 5, wherein a size of the at least one coil is less than a size of the excitation coil.

8. The lidar according to claim 5, wherein the two coils are disposed on two sides of the rotation axis and are symmetrical with respect to the rotation axis.

* * * * *